(12) United States Patent
Martin et al.

(10) Patent No.: US 12,131,033 B2
(45) Date of Patent: Oct. 29, 2024

(54) EXTENDING FLASH MEDIA ENDURANCE

(71) Applicant: Dell Products L.P., Round Rock, TX (US)

(72) Inventors: Owen Martin, Hopedale, MA (US); Michael J. Scharland, Franklin, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/104,397

(22) Filed: Feb. 1, 2023

(65) Prior Publication Data

US 2024/0256143 A1    Aug. 1, 2024

(51) Int. Cl.
*G06F 3/06* (2006.01)

(52) U.S. Cl.
CPC .......... *G06F 3/0616* (2013.01); *G06F 3/0635* (2013.01); *G06F 3/067* (2013.01)

(58) Field of Classification Search
CPC ....... G06F 3/0616; G06F 3/0635; G06F 3/067
See application file for complete search history.

(56) References Cited

U.S. PATENT DOCUMENTS

| | | | |
|---|---|---|---|
| 10,430,723 B1 * | 10/2019 | Tzur | G06F 3/0685 |
| 2017/0090775 A1 * | 3/2017 | Kowles | G06F 3/0608 |
| 2018/0365167 A1 * | 12/2018 | Eckert | G06F 12/1036 |
| 2019/0243771 A1 * | 8/2019 | Mittal | G06F 3/0647 |
| 2021/0286542 A1 * | 9/2021 | Dalmatov | G06F 3/0685 |

* cited by examiner

*Primary Examiner* — Prasith Thammavong
(74) *Attorney, Agent, or Firm* — Krishnendu Gupta; Nikhil Patel (57) ABSTRACT

One or more aspects of the present disclosure relate to extending the endurance of flash media. In embodiments, an input/output (IO) workload can be received at a storage array. In addition, one or more characteristics of each write-IO in the IO workload can be determined. Further, for each write-IO, a portion of a storage device of a plurality of storage devices can be dynamically allocated based on the one or more characteristics and an endurance level of each of the plurality of storage devices.

20 Claims, 6 Drawing Sheets

EXTENDING FLASH MEDIA ENDURANCE

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to extending the endurance of flash media. In embodiments, an input/output (IO) workload is received at a storage array. In addition, one or more characteristics of each write-IO in the IO workload are determined. Further, for each write-IO, a portion of a storage device of a plurality of storage devices is dynamically allocated based on the one or more characteristics and an endurance level of each of the plurality of storage devices.

In embodiments, a granularity level of analysis can be selected based on at least one performance constraint of the storage array. Further, the one or more write-IO characteristics can be determined at the granularity level.

In embodiments, the at least one performance constraint can correspond to one or more of a memory capacity or availability and a processing capability of the storage array.

In embodiments, each storage device of the plurality of storage devices with an endurance level greater than a first threshold can be established as a high endurance device. Further, each storage device of the plurality of storage devices with an endurance level less than a second threshold can be established as a low endurance device.

In embodiments, an IO traffic shape of the IO workload can be determined based on at least the one or more characteristics of each IO in the IO workload. In addition, a compressibility level of write data corresponding to each write-IO in the IO workload can be determined. Further, a read-and-write skew can be identified based on the IO traffic shape.

In embodiments, one or more IO workload forecasts can be dynamically established based on at least one or more of the following: historical traffic shapes, current IO traffic shapes, the write data compressibility levels, and the read-and-write skews.

In embodiments, physical storage address spaces corresponding to logical storage targets associated with each IO in the IO workload can be identified. Further, the endurance level of each identified physical storage address space's corresponding storage device can be determined.

In embodiments, a storage device hierarchy can be established based on the endurance level of each of the plurality of storage devices. Additionally, a high endurance tier in the storage device hierarchy can be formed to include each of the plurality of storage devices with an endurance level greater than a threshold. Further, a low endurance tier in the storage device hierarchy can be formed to include each of the plurality of storage devices with an endurance level less than the threshold.

In embodiments, a storage allocation model can be established based on the one or more IO workload forecasts and the storage device hierarchy. Further, storage device resources to service the IO workload's write-IOs can be dynamically allocated based on the storage allocation model.

In embodiments, a garbage collection tiering model can be established based on the storage allocation model. In addition, a garbage collection operation using the garbage collection tiering model can be executed. For example, the garbage collection operation can include maintaining a storage tier of a data portion stored in the plurality of storage devices, up-tiering the data portion to a storage device in the high endurance tier, or down-tiering the data portion to a storage device in the low endurance tier.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

Figure 1:
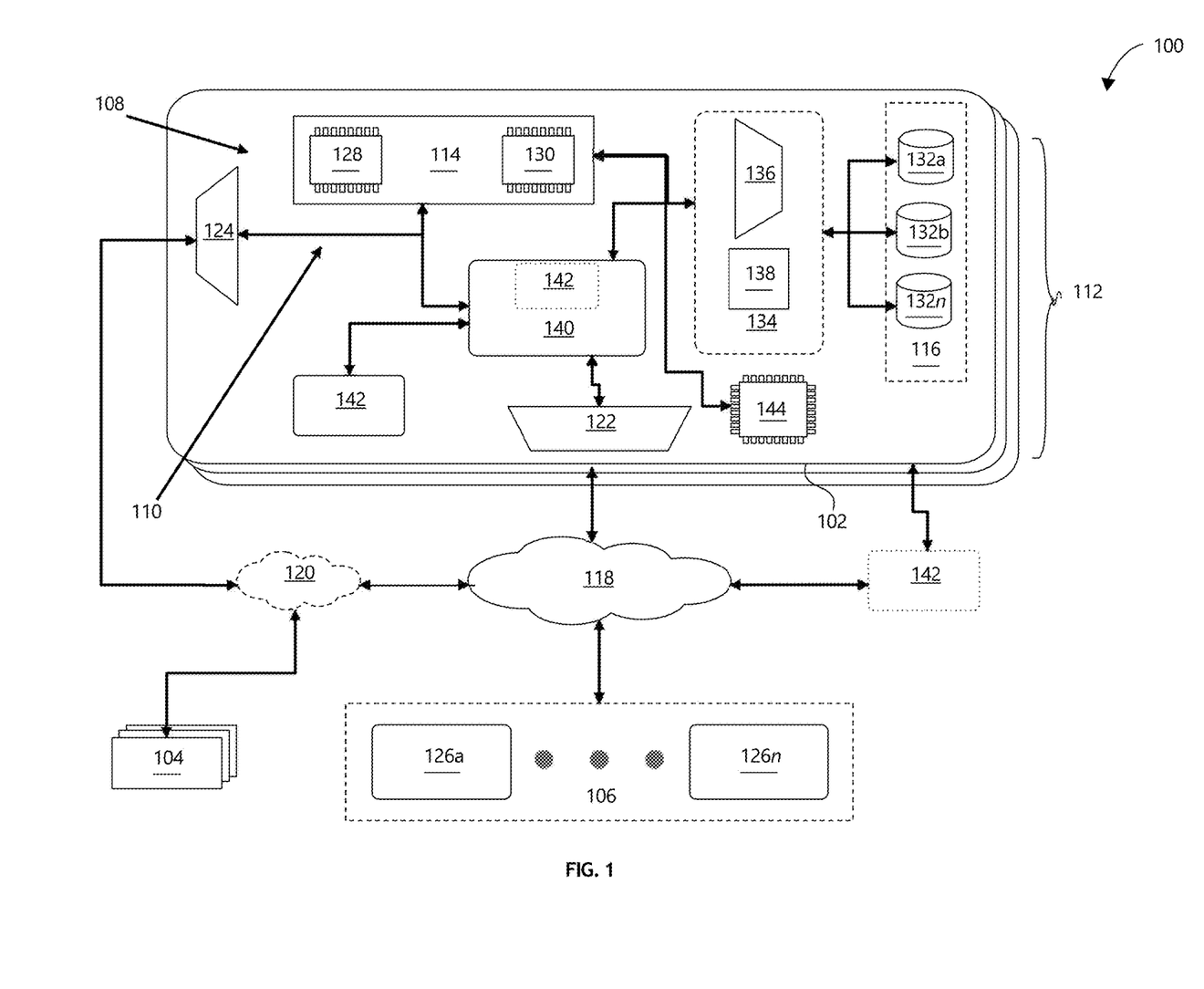
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112 that includes the storage array 102 and one or more other storage arrays.

In embodiments, the storage array 102, components 108, and remote system 104 can include a variety of proprietary or commercially available single or multiprocessor systems (e.g., parallel processor systems). Single or multiprocessor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multiprocessor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that controls access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
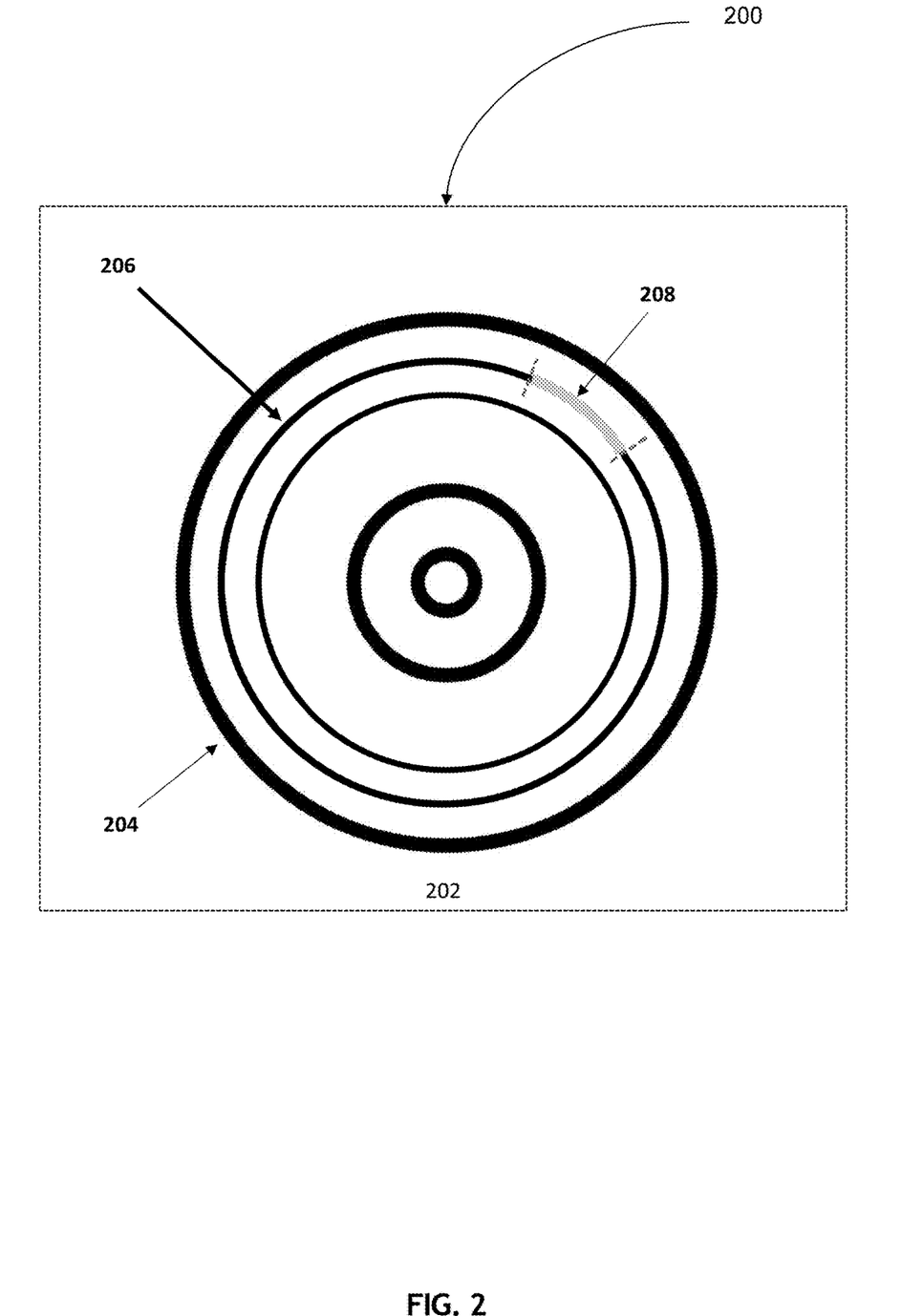
FIG. 2 is a cross-sectional view of a storage device in accordance with embodiments of the present disclosure.

Regarding FIG. 2, the storage array's EDS 140 can virtualize the array's persistent storage 116. Specifically, the EDS 140 can virtualize a storage device 200, which is substantially like one or more of the storage devices 132a-n. For example, the EDS 140 can provide a host, e.g., client machine 126a, with a virtual storage device (e.g., thin-device (TDEV)) that logically represents zero or more portions of each storage device 132a-n. For example, the EDS 140 can establish a logical track using zero or more physical address spaces from each storage device 132a-n. Specifically, the EDS 140 can establish a continuous set of logical block addresses (LBA) using physical address spaces from the storage devices 132a-n. Thus, each (LBA) represents a corresponding physical address space from one of the storage devices 132a-n. For example, a track can include 256 LBAs, amounting to 128 kb of physical storage space. Further, the EDS 140 can establish the TDEV using several tracks based on a desired storage capacity of the TDEV. Additionally, the EDS 140 can establish extents that logically define a group of tracks.

In embodiments, the EDS 140 can provide each TDEV with a unique identifier (ID) like a target ID (TID). Additionally, EDS 140 can establish a logical unit number (LUN) that maps each track of a TDEV to its corresponding physical track location using pointers. Further, the EDS 140 can also generate a searchable data structure, mapping logical storage representations to their corresponding physical address spaces. Thus, EDS 100 can enable the HA 122 to present the hosts 106 with the logical storage representations based on host or application performance requirements.

For example, the persistent storage 116 can include an HDD 202 with stacks of cylinders 204. Like a vinyl record's grooves, each cylinder 204 can include one or more tracks 206. Each track 206 can include continuous sets of physical address spaces representing each of its sectors 208 (e.g., slices or portions thereof). The EDS 140 can provide each slice/portion with a corresponding logical block address (LBA). Additionally, the EDS 140 can group sets of continuous LBAs to establish one or more tracks. Further, the EDS 140 can group a set of tracks to establish each extent of a virtual storage device (e.g., TDEV). Thus, each TDEV can include tracks and LBAs corresponding to one or more of the persistent storage 116 or portions thereof (e.g., tracks and address spaces).

As stated herein, the persistent storage 116 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 140 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts' performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102 can allocate the array's memory/storage resources based on an IO workload's anticipated volume of IO messages associated with each SL tier and the memory hierarchy.

For example, the EDS 140 can establish the hierarchy to include one or more tiers (e.g., subsets of the array's storage and memory) with similar performance capabilities (e.g., response times and uptimes). Thus, the EDS 140 can establish fast memory and storage tiers to service host-identified critical and valuable data (e.g., Platinum, Diamond, and Gold SLs). In contrast, slow memory and storage tiers can service host-identified non-critical and less valuable data (e.g., Silver and Bronze SLs). Additionally, the EDS 140 can define "fast" and "slow" performance metrics based on relative performance measurements of the array's memory 114 and persistent storage 116. Thus, the fast tiers can include memory 114 and persistent storage 116, with relative performance capabilities exceeding a first threshold. In contrast, slower tiers can include memory 114 and persistent storage 116, with relative performance capabilities falling below a second threshold. Further, the first and second thresholds can correspond to the same threshold.

Figure 3:
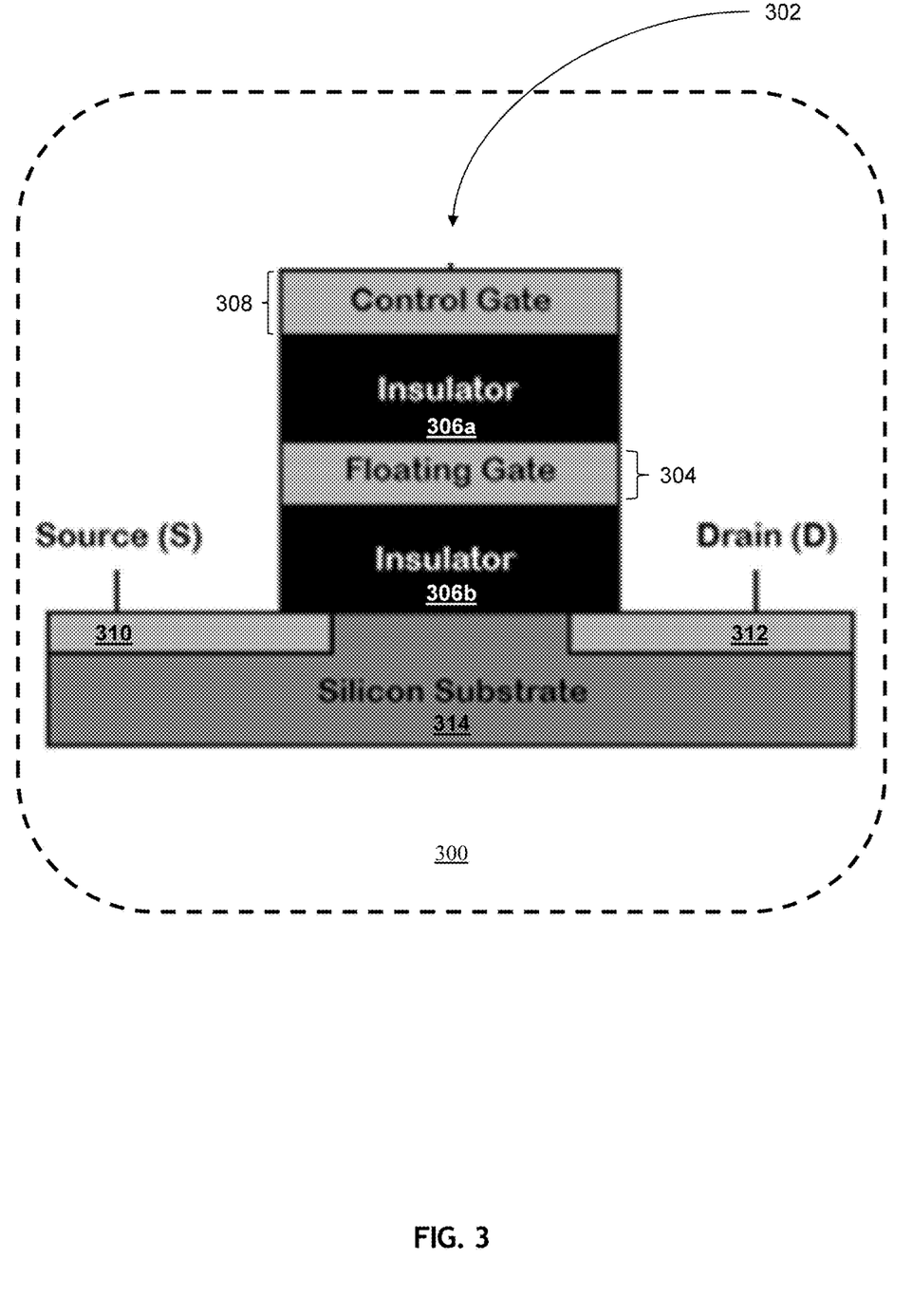
FIG. 3 is a block diagram of a solid-state storage device in accordance with embodiments of the present disclosure.

Regarding FIG. 3, the storage array's persistent storage 116 can include an SSD 300 (e.g., a NAND (NOT-AND) flash drive) that includes a plurality of NAND flash cells like NAND flash cell 302. The NAND flash cell 302 can store a single bit of data by setting its state to either a 0 or 1. In embodiments, the flash cell 302 can include a floating gate transistor 304 isolated by oxide-insulating layers 306a-b.

Further, the floating gate 304 can be charged and represent a binary 0. In contrast, when the floating gate 304 has no charge, it can represent a binary 1.

To read data from the flash cell 302, the DA 136 of FIG. 1 can have a voltage applied to a control gate 308 while attempting current flow from the flash cell's source 310 to its drain 312. If there is no current flow, it signifies the floating gate 304 is charged (binary 0), and if there is current flow, the floating gate is not charged (binary 1). In addition, the DA 136 can write data to the flash cell 302 by having a high voltage applied to the control gate 308 to cause electrons to move from the flash cell's silicon substrate 314 to the floating gate 304, e.g., tunneling. Further, the DA 136 can erase data from the flash cell 302 by having a high voltage applied to the silicon substrate 314, causing electrons to move from the floating gate 304 to the substrate 314.

Unfortunately, writing and erasing data from a flash cell introduces stress to the oxide-insulating layers 306a-b. Over time, continual stress will cause the oxide-insulating layers 306a-b to break down, and the floating gate 304 will become unable to maintain a charge. Accordingly, the flash cell 302 will eventually become unusable along with other cells of the SSD 300. In embodiments, the persistent storage 116 can include one or more high and low-endurance SSDs. For example, a high-endurance SSD can include NAND flash cells that can have a longevity exceeding a threshold, while a low-endurance SSD can include flash cells with a longevity below the threshold. For example, the threshold can define an amount of tunneling operations, writes, or erasures.

Figure 4:
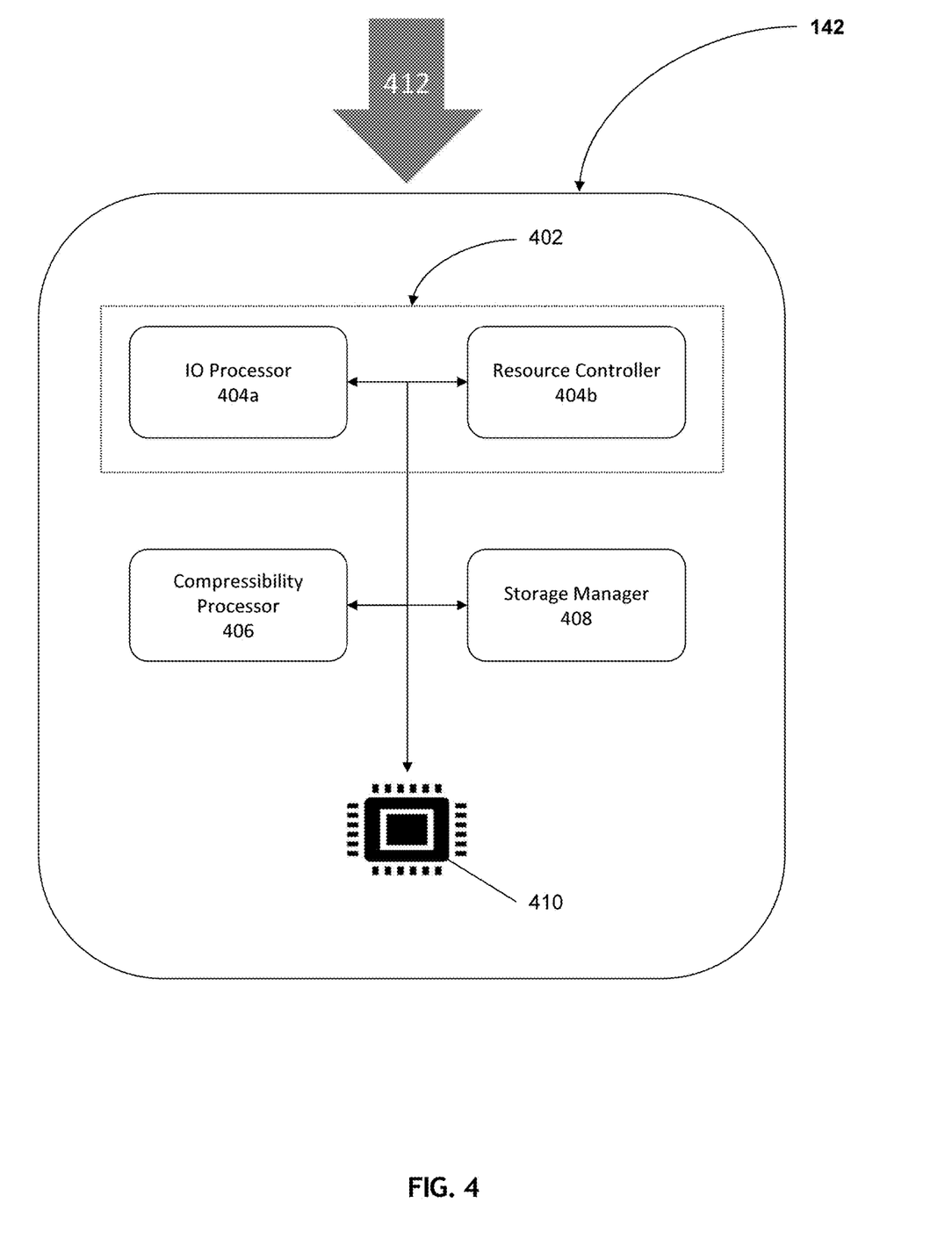
FIG. 4 is a block diagram of a controller in accordance with embodiments of the present disclosure.

Regarding FIG. 4, a controller 142 of a storage array 102 can include an analyzer 402 that analyzes IOs corresponding to an IO workload 412. Specifically, the IO workload can correspond to IOs the storage array 102 receives during a predetermined period (e.g., snapshot). For example, the analyzer 402 can include an IO processor 404a that identifies each IO's characteristics. For example, each IO can include metadata associated with an IO type, data track related to the data involved with each IO, time, performance metrics, telemetry data, and the like. Further, the IO processor 404a can include logic or circuitry defining a neural network pattern identifier. Accordingly, the IO processor 404a can process historical and current IOs to identify temporal patterns associated with the IO workload 412 and its IOs characteristics.

In embodiments, the analyzer 402 can also include a resource controller 404b that analyzes the array's storage devices (e.g., the storage devices 132a-n of FIG. 1) to determine each device's endurance level. Further, the resource controller 404b can categorize storage devices with an endurance level greater than a first threshold as high-endurance. Additionally, the resource controller 404b can categorize the storage devices with endurance levels below a second threshold as low-endurance. In embodiments, each threshold can correspond to the storage devices' longevity of flash cells, as described in greater detail above. Accordingly, the resource controller 404b can maintain a mapping of storage device endurance levels in local memory 410.

Further, the resource controller 404b can identify a target track and extent corresponding to each IO of the IO workload 412. Specifically, each IO's metadata can include a track identifier (TID) representing an IO's target TDEV and corresponding track. In embodiments, using the TID, the resource controller 404b can search a lookup table stored in, e g., the local memory 410 to identify a physical storage device (e.g., one of the storage devices 132a-n of FIG. 1) and its track mapped to the TID. In addition, the resource controller 404b can include logic or circuitry defining a neural network pattern identifier that identifies patterns corresponding to target TIDs of the IO workload 412. For example, the resource controller 404b can analyze historical and current IOs of the IO workload 412 to maintain a workload model in the local memory 410. As a result, the workload model can identify a workload skew that identifies the skew of write-IO and read-IO requests of the IO workload 412. In addition, the workload model can identify an IO load corresponding to each extent (e.g., logical TID groups) of each target TDEV. Thus, the workload model can define an IO traffic shape of the workload 412.

In embodiments, the controller 142 can include a compressibility processor 406 that analyzes the compressibility of data corresponding to each IO in the IO workload 412. For example, the compressibility processor 406 can process the data using any known or yet-to-be-known technique to determine the compressed size of each IO's corresponding data. Further, the processor 406 can map each IO's corresponding TID with a compression ratio between the compressed and original data sizes corresponding to each TID. In addition, the processor 406 can group IOs targeting each extent into bins, with each bin defining a unique compression level. For example, the processor 406 can use data smoothing techniques to generate several average compression ratios based on the compression ratios of each extent's corresponding TIDs.

Suppose, for example, that processor 406 generates sixteen (16) average compression ratios using a data smoothing technique. Then, processor 406 can generate compression levels 0-16 and map each average compression ratio to a corresponding compression level. Thus, the processor 406 can, for each extent, can represent the mapping as a compressibility histogram (e.g., the compressibility histogram 500 of FIG. 5) that identifies IOs per second (IOPS) per extent level, as described in greater detail below. Further, for each IO workload, the processor 406 can maintain a compression workload model in local memory 410 that maps each extent to its corresponding compressibility histogram.

In embodiments, the controller 142 can include a storage manager 408 that can define a storage model that directs IOs of the IO workload 412 to either a high-endurance or low-endurance storage device. For example, the manager 408 can generate the storage model using the load density (e.g., read-and-write skews) of each extent defined by the IO traffic shape of the IO workload 412. In addition, the manager 408 can generate the storage model by using a load density forecast for each compression level defined by the processor 406 using compression workload models corresponding to the IO workload 412. Additionally, the manager 408 can generate the storage model using a compression overhead factor (COF), defining the latency corresponding to each extent's compression level bins.

For example, the storage model can define an extent remapping that defines policies for migrating each TDEV's extent to either a high-endurance or low-endurance storage device. For example, the storage model can remap each extent, forecasted to have an IO read skew and write-IOs with average compressibility greater than a threshold compressibility ratio (e.g., 50%), to a low-endurance storage device. Additionally, the model can remap extents, forecasted to have an IO write skew, and write IOs with average compressibility less than the threshold, to a high-endurance storage device.

Thus, the DA 136 can use the storage model to destage write-IOs to the array's persistent storage 116. Further, during garbage collection of each TDEV and corresponding storage devices, the DA 136 can use the storage model to migrate each extent to either a high-endurance or low-endurance storage device.

Figure 5:
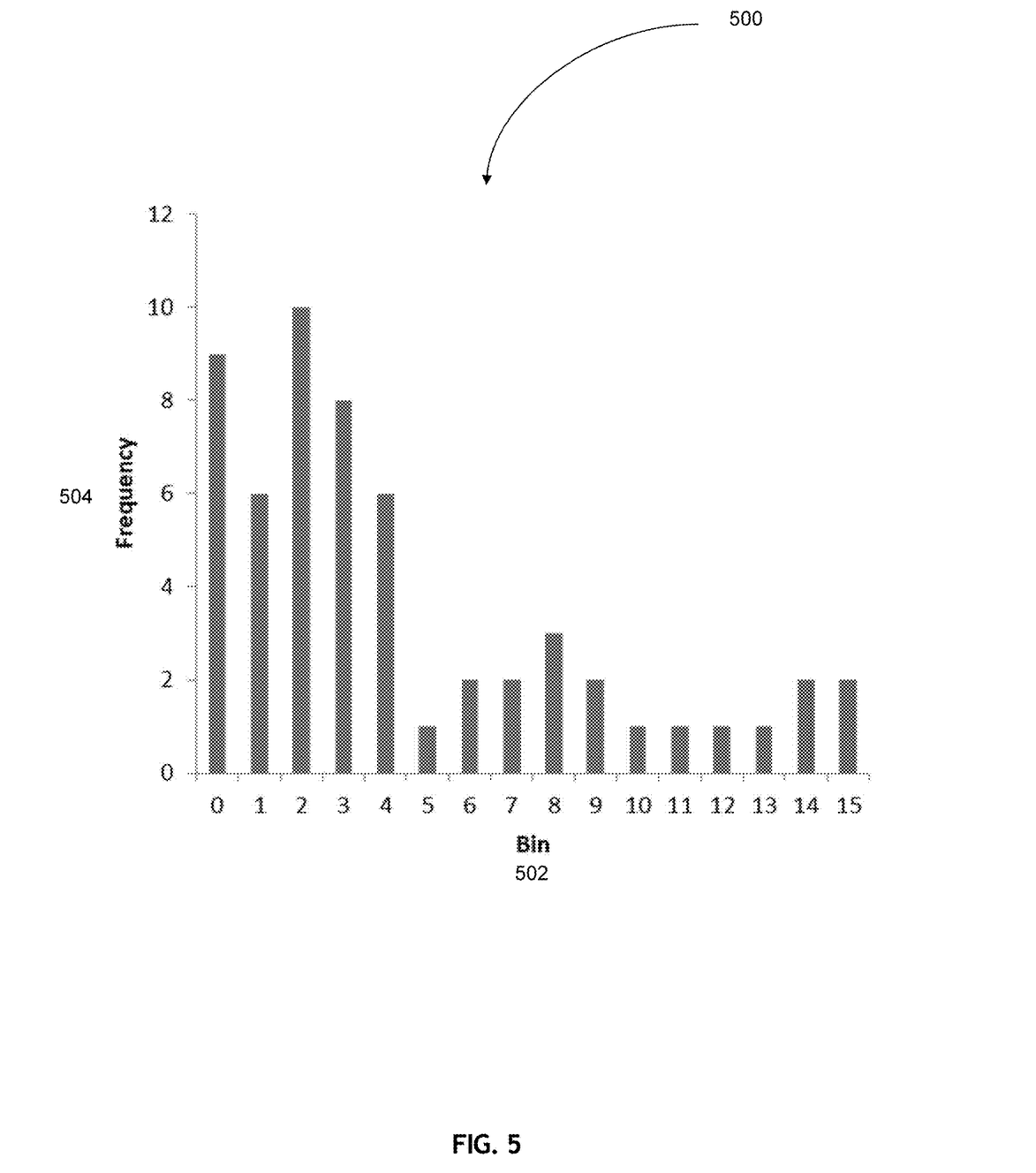
FIG. 5 illustrates a compressibility histogram in accordance with embodiments of the present disclosure.

Regarding FIG. 5, an example compressibility histogram 500 of a portion of a TDEV maps a frequency of IOs 504 as a function of each IO's corresponding compressibility 502. For example, the portion can correspond to a track or an extent of the TDEV. Accordingly, the histogram 500 can group IOs targeting an extent of the TDEV into bins 502. Each bin 502 can correspond to a compressibility level corresponding to each IO. For example, the histogram 500 shows compressibility levels 0-15, where 0 represents an IO corresponding to data that can be deduplicated, 1 represents an IO corresponding to data that is the most compressible, and 15 represents an IO corresponding to data that is the least compressible.

Further, each compressibility level can represent IOs having data with an average compressibility level (e.g., a ratio between the data's compressed size and its original size). Further, the histogram 500 shows a frequency of IOs with data corresponding to each compressibility level. Specifically, the IO frequency of each compressibility level can correspond to a smoothing of time-series sampling of IOs during, e.g., a predetermined snapshot duration.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 6:
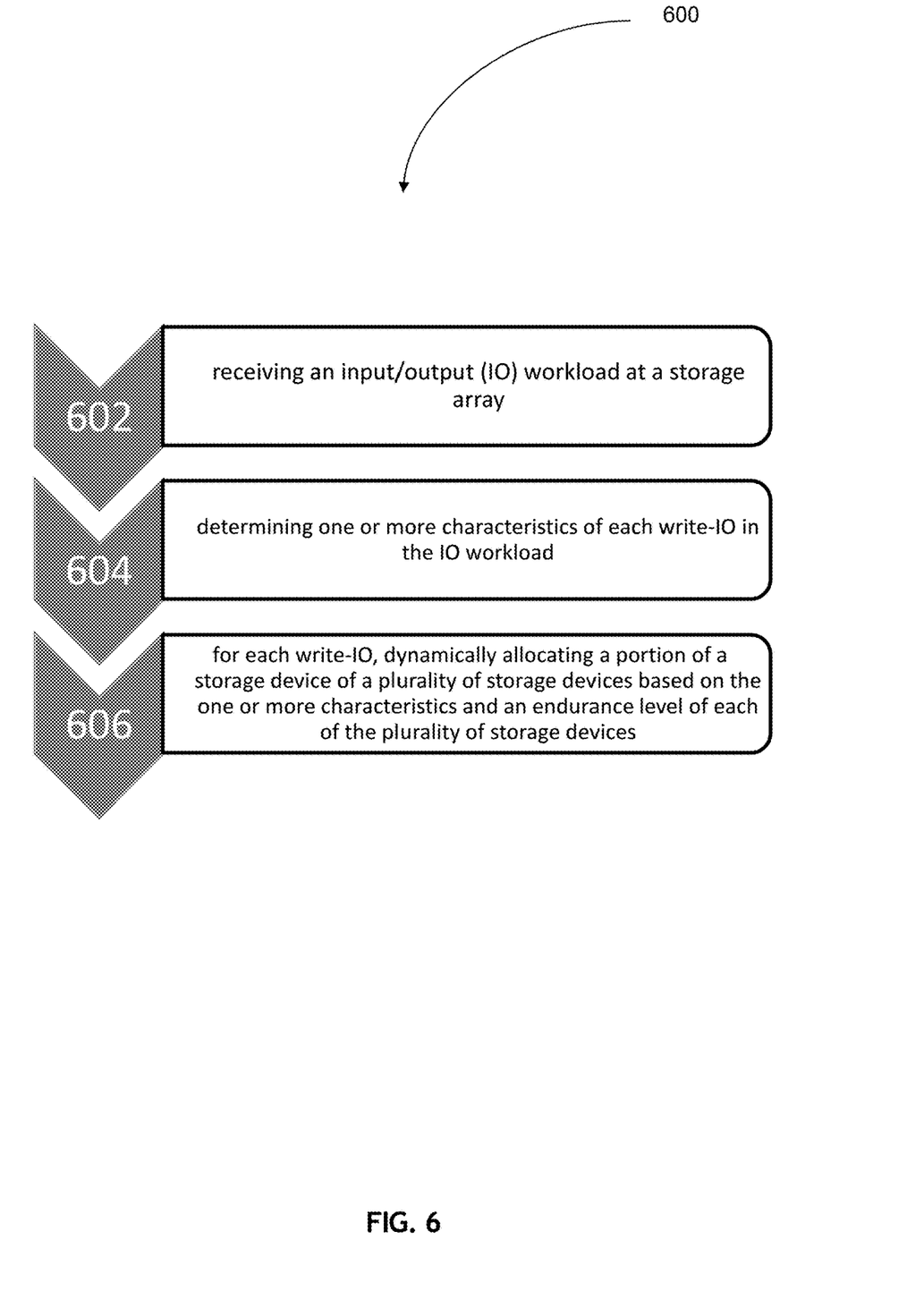
FIG. 6 is a flow diagram of a method that extends a storage array's flash media endurance per embodiments of the present disclosure.

Regarding FIG. 6, a method 600 relates to extending an endurance of flash media corresponding to a storage array's persistent storage (e.g., storage 116 of FIG. 1). In embodiments, the controller 142 of FIG. 1 can perform all or a subset of operations corresponding to method 600.

For example, the method 600, at 602, can include receiving an input/output (IO) workload at a storage array. Additionally, at 604, the method 600 can include determining one or more characteristics of each write-IO in the IO workload. Further, for each write-IO, the method 600, at 606, can include dynamically allocating a portion of a storage device of a plurality of storage devices based on the one or more characteristics and an endurance level of each of the plurality of storage devices.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer having a display device that enables user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship.

Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
   receiving an input/output (IO) workload at a storage array;
   determining one or more characteristics of each write-IO in the IO workload; and
   for each write-IO, dynamically allocating a portion of a storage device of a plurality of storage devices based on the one or more characteristics and an endurance level of each of the plurality of storage devices, wherein dynamically allocating the portion of the storage device includes:
   mapping each extent forecasted to have an IO read skew and write-IOs with an average compressibility greater than a threshold compressibility ratio to a storage device portion corresponding to a storage device with an endurance level greater than an endurance threshold, and
   mapping each extent forecasted to have an IO write skew and write-Ios with an average compressibility less than the threshold compressibility ratio to a storage device portion corresponding to a storage device with an endurance level less than the endurance threshold.

2. The method of claim 1, further comprising:
   selecting a granularity level of analysis based on at least one performance constraint of the storage array; and
   determining the one or more write-IO characteristics at the granularity level.

3. The method of claim 2, wherein the at least one performance constraint corresponds to one or more of a memory capacity or availability and a processing capability of the storage array.

4. The method of claim 1, further comprising:
establishing each storage device of the plurality of storage devices with an endurance level greater than a first threshold as a high endurance device; and
establishing each storage device of the plurality of storage devices with an endurance level less than a second threshold as a low endurance device.

5. The method of claim 1, further comprising:
determining an IO traffic shape of the IO workload based on at least the one or more characteristics of each IO in the IO workload;
determining a compressibility level of write data corresponding to each write-IO in the IO workload; and
identifying a read-and-write skew based on the IO traffic shape.

6. The method of claim 5, further comprising:
dynamically establishing one or more IO workload forecasts based on at least one or more of the following: historical traffic shapes, current IO traffic shapes, the write data compressibility levels, and the read-and-write skews.

7. The method of claim 6, further comprising:
identifying a physical storage address spaces corresponding to logical storage targets associated with each IO in the IO workload; and
determining the endurance level of each identified physical storage address space's corresponding storage device.

8. The method of claim 7, further comprising:
establishing a storage device hierarchy based on the endurance level of each of the plurality of storage devices;
forming a high endurance tier in the storage device hierarchy, including each of the plurality of storage devices with an endurance level greater than a threshold;
forming a low endurance tier in the storage device hierarchy, including each of the plurality of storage devices with an endurance level less than the threshold.

9. The method of claim 8, further comprising:
establishing a storage allocation model based on the one or more IO workload forecasts and the storage device hierarchy; and
dynamically allocating storage device resources to service the IO workload's write-IOs based on the storage allocation model.

10. The method of claim 9, further comprising:
establishing a garbage collection tiering model based on the storage allocation model; and
executing a garbage collection operation using the garbage collection tiering model, wherein the garbage collection operation includes performing one of the following:
maintaining a storage tier of a data portion stored in the plurality of storage devices,
up-tiering the data portion to a storage device in the high endurance tier, or
down-tiering the data portion to a storage device in the low endurance tier.

11. A system with a memory and processor, the system configured to:
receive an input/output (IO) workload at a storage array;
determine one or more characteristics of each write-IO in the IO workload; and
for each write-IO, dynamically allocating a portion of a storage device of a plurality of storage devices based on the one or more characteristics and an endurance level of each of the plurality of storage devices, wherein dynamically allocating the portion of the storage device includes:
mapping each extent forecasted to have an IO read skew and write-IOs with an average compressibility greater than a threshold compressibility ratio to a storage device portion corresponding to a storage device with an endurance level greater than an endurance threshold, and
mapping each extent forecasted to have an IO write skew and write-Ios with an average compressibility less than the threshold compressibility ratio to a storage device portion corresponding to a storage device with an endurance level less than the endurance threshold.

12. The system of claim 11, further configured to:
select a granularity level of analysis based on at least one performance constraint of the storage array; and
determine the one or more write-IO characteristics at the granularity level.

13. The system of claim 12, wherein the at least one performance constraint corresponds to one or more of a memory capacity or availability and a processing capability of the storage array.

14. The system of claim 11, further configured to:
establish each storage device of the plurality of storage devices with an endurance level greater than a first threshold as a high endurance device; and
establish each storage device of the plurality of storage devices with an endurance level less than a second threshold as a low endurance device.

15. The system of claim 11, further configured to:
determine an IO traffic shape of the IO workload based on at least the one or more characteristics of each IO in the IO workload;
determine a compressibility level of write data corresponding to each write-IO in the IO workload; and
identify a read-and-write skew based on the IO traffic shape.

16. The system of claim 15, further configured to:
dynamically establish one or more IO workload forecasts based on at least one or more of the following: historical traffic shapes, current IO traffic shapes, the write data compressibility levels, and the read-and-write skews.

17. The system of claim 16, further configured to:
identify a physical storage address spaces corresponding to logical storage targets associated with each IO in the IO workload; and
determine the endurance level of each identified physical storage address space's corresponding storage device.

18. The system of claim 17, further configured to:
establish a storage device hierarchy based on the endurance level of each of the plurality of storage devices;
form a high endurance tier in the storage device hierarchy, including each of the plurality of storage devices with an endurance level greater than a threshold;
form a low endurance tier in the storage device hierarchy, including each of the plurality of storage devices with an endurance level less than the threshold.

19. The system of claim 18, further configured to:
establish a storage allocation model based on the one or more IO workload forecasts and the storage device hierarchy; and
dynamically allocate storage device resources to service the IO workload's write-IOs based on the storage allocation model.

20. The system of claim 19, further configured to:
establish a garbage collection tiering model based on the storage allocation model; and
execute a garbage collection operation using the garbage collection tiering model, wherein the garbage collection operation includes performing one of the following:
maintaining a storage tier of a data portion stored in the plurality of storage devices,
up-tiering the data portion to a storage device in the high endurance tier, or
down-tiering the data portion to a storage device in the low endurance tier.

* * * * *